April 17, 1945.   E. WURGER   2,373,989
OPTICAL APPARATUS FOR GAUGING
Filed April 29, 1942
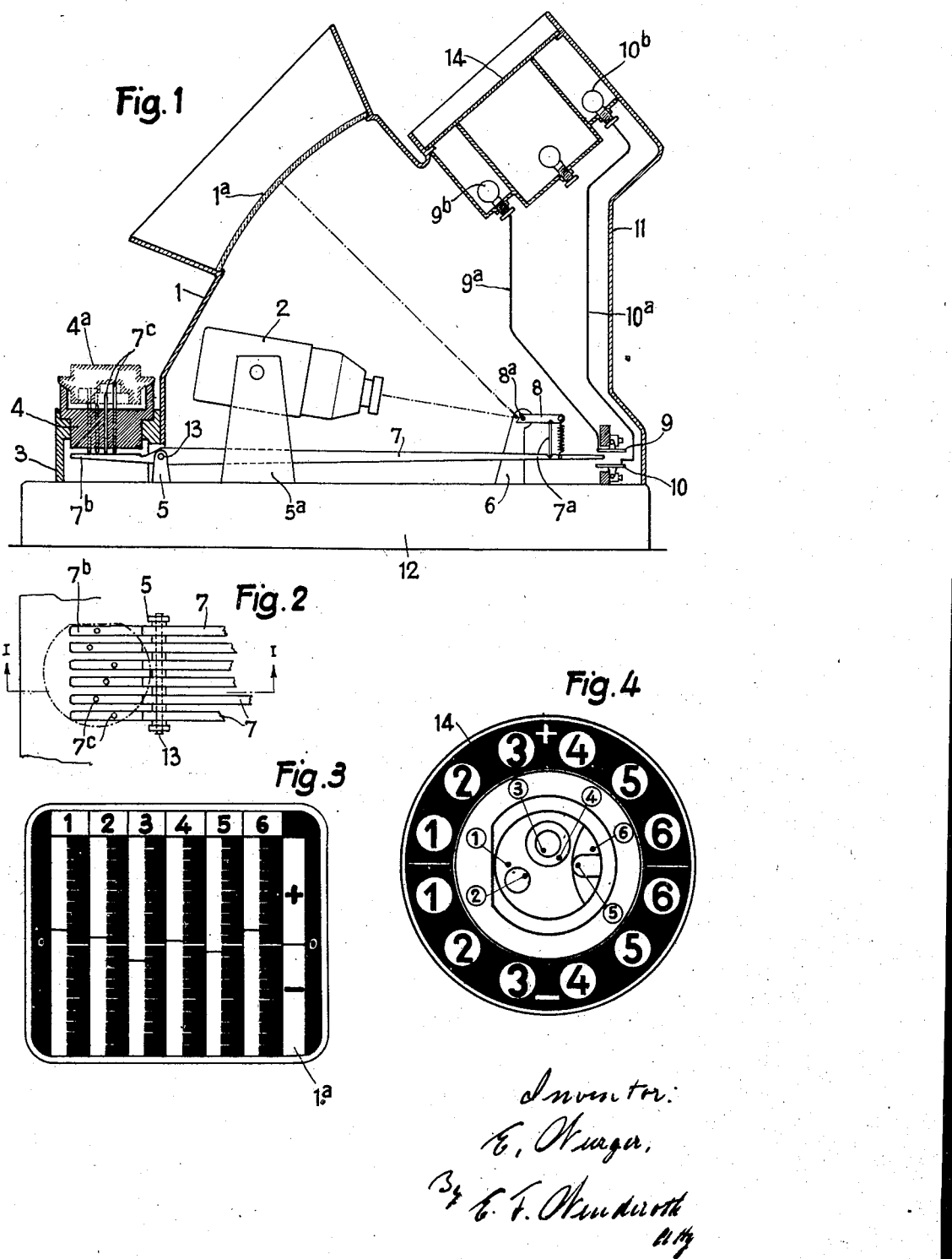

Patented Apr. 17, 1945

2,373,989

UNITED STATES PATENT OFFICE 2,373,989

OPTICAL APPARATUS FOR GAUGING

Emile Wurger, Le Locle, Switzerland

Application April 29, 1942, Serial No. 441,023
In Switzerland January 15, 1941

1 Claim. (Cl. 88—24)

The present invention relates to an optical apparatus for gauging, comprising a projector and indicating screen. According to the invention a set of levers of which each actuates a reflector redirects a ray it receives from the projector on the said screen, the levers each co-operating at one end with a push rod designed to contact with a particular point or region on the workpiece when the latter is in position, and at the other end with one or the other of a pair of electric contacts when the dimension of the corresponding point or region on the workpiece is outside the permitted tolerance one way or the other, an electric signalling device in whose circuit the contacts are included then being brought into action.

The accompanying drawing illustrates by way of example one form of embodiment of the invention.

Figure 1 is a vertical section of the optical gauging apparatus,

Figure 2 is a plan view of a part of the apparatus,

Figures 3 and 4 show details of the apparatus.

The apparatus shown comprises a base 12 on which are mounted three sets of pillars 5, 5ª and 6. The pillars 5 support a spindle 13 on which pivot six levers 7 (Figure 2) which through links 7ª transmit oscillations imparted to them, each to a reflector 8 having a silvered surface 8ª.

On the pillars 5ª is supported a projector 2 which comprises in known manner, a reflector, a lamp, a condenser, a transparency marked with a fine hair-line, and an objective. Images of the line are thus projected by the re-direction of the reflector 8 on to a reading screen 1ª secured inside the casing 1 of the apparatus. This screen is shown in Figure 3 wherein it will be seen that a scale with + and — graduations is provided for each of the six levers 7.

At the ends of the levers are contacts 9 and 10. They are adjustable on their supports to agree with the limits of tolerance admissible for the corresponding dimensions of the workpiece. The contacts 10 when touched by the levers 7 complete an electric supply circuit through conductors 10ª and red lamps 10ᵇ carried in a signal lamp 11, which indicates that the tolerance has been exceeded in a direction not admitting of rectification of the workpiece. The contacts 9 operate in a similar manner, being connected, however, by contactors 9ª to blue lamps 9ᵇ indicating that the tolerance has been exceeded in the direction which does admit of rectification.

The lamps 9ᵇ and 10ᵇ are covered by an indicator disc 14 (Figure 4) provided at its centre with a diagram of the workpiece 4ª, on which are indicated by the circled references ① to ⑥ the six particular points or regions at which the push rods 7ᶜ co-operating with the ends 7ᵇ of the levers 7, make contact with the workpiece 4ª when the latter is in position on a gauging member 4 which takes its bearing on a support 3 and in which slide the push rods 7ᶜ. The disc 14 is also provided over its peripheral margin with a series of + figures 1 to 6 and a series of — figures 1 to 6, corresponding in position to the respective red and blue lamps 9ᵇ and 10ᵇ.

If when the workpiece is in position the ends of the levers 7 are between the contacts 9 and 10, no signal is given; this indicates that the workpiece is correct and all the gauged dimensions are within the permitted tolerances, the actual variations from the nominal dimensions being indicated on screen 1ª. If, however, for example, the red lamp corresponding to Figure 5 of the + series lights up, it is immediately apparent that the dimension of the workpiece is beyond the + limit at the point or region 5. The apparatus accordingly enables it to be seen at a glance whether the dimensions of a workpiece are within the +ve and —ve limits of tolerance, and if not the apparatus also indicates at which point the piece is in error and in which direction. Thus the apparatus enables the pieces to be sorted into those which are correct, those which need to be rectified and those which must be scrapped.

What I claim is:

An optical gauging device comprising a projector, an indicating screen, a set of levers, a set of corresponding reflectors each actuated by one of said levers and re-directing a ray from said projector on to said screen, a corresponding set of push rods each adapted to make contact with a respective region of a workpiece to be gauged when the workpiece is placed in position in the device, a corresponding set of pairs of electric contacts juxtaposed to the other ends of said levers, one contact of each pair being located to be touched by the corresponding lever end when the corresponding dimension of the workpiece reaches one limit of tolerance and the other contact located to be touched by the lever end when the corresponding dimension of the workpiece reaches the other limit of tolerance, and respective electric signals whose circuits are closed by the contacts.

EMILE WURGER.